Sept. 23, 1958 A. A. KARRASCH 2,853,064
VACUUM CONTROLLED DEVICE FOR ENGINES
Filed May 18, 1956 2 Sheets-Sheet 2
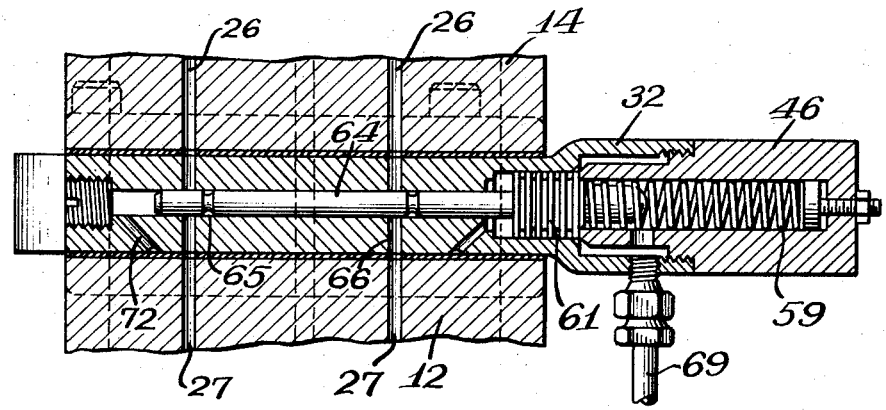
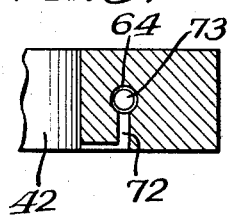
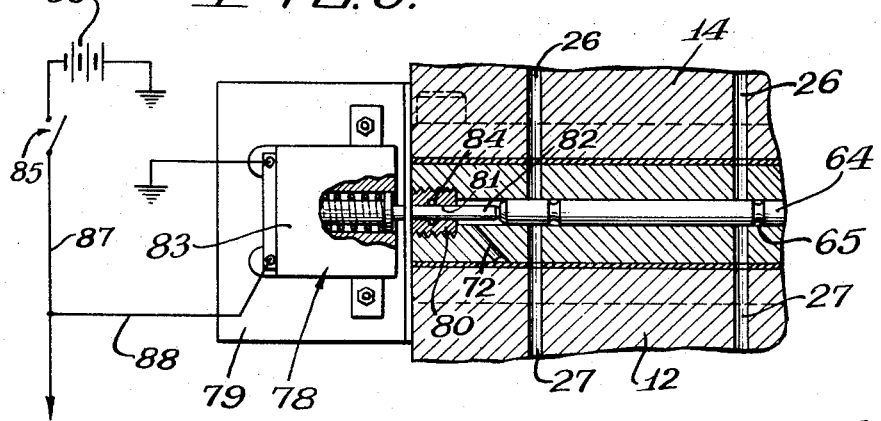
Inventor:
Adolph A. Karrasch
Atty.

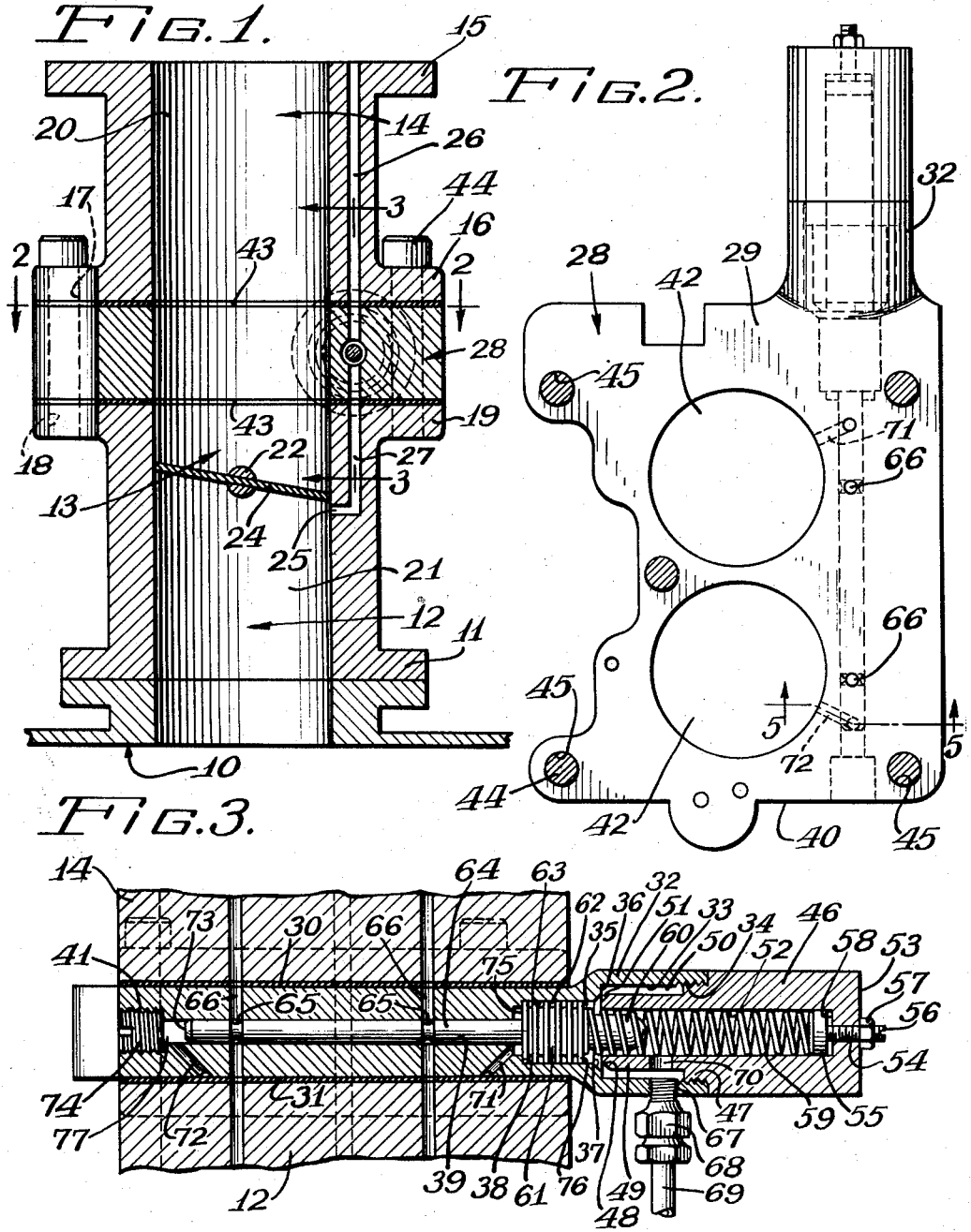

United States Patent Office 2,853,064
Patented Sept. 23, 1958

2,853,064

VACUUM CONTROLLED DEVICE FOR ENGINES

Adolph A. Karrasch, Indianapolis, Ind.

Application May 18, 1956, Serial No. 585,908

14 Claims. (Cl. 123—97)

This invention relates to charge forming devices for internal combustion engines and more specifically for automatically controlling the supply of fuel mixture to the internal combustion engine of a motor vehicle under certain operating conditions of the vehicle.

It is the usual practice to provide gasoline type engines utilized to propel motor vehicles with a carburetor for forming a combustible air fuel mixture and a manifold for distributing the air fuel mixture to the engine cylinders. The usual engine carburetor associated with such engines includes a manually operable butterfly-type throttle plate valve for regulating the amount of air and thus the air fuel ratio of the mixture flowing through the manifold to the engine cylinders. Inasmuch as a rich mixture is required for recovery of an engine following deceleration, and to to permit proper operation of the engine at idling speed, carburetors are constructed to provide a rich mixture when the throttle valve is in its closed position by admitting air-fuel mixture to the carburetor at a point downstream from the throttle plate when the throttle plate is in its closed position. It is, therefore, evident that whenever the engine is operated with a closed throttle valve the air-fuel mixture delivered to the intake manifold is excessively rich, as is required. However, when the motor vehicle is coasting downhill and the engine throttle valve is in its closed position, the engine is being driven by the road wheels at a speed above the normal idling speed. A much lower pressure or greater vacuum exists downstream from the throttle plate and in the intake manifold than normally would be present if the engine speed corresponded to the proper idling speed. The abnormally low pressure present in the intake manifold draws raw fuel from the idle jet at flow rates very much greater than normal with the result that the already excessively rich air fuel mixture is further enriched. It is obvious that the air fuel mixture supplied to the engine cylinders when the engine is operated under the conditions noted above is so rich that complete combustion cannot take place, with the result that the exhaust is filled with objectionable and obnoxious smoke, fumes and hydrocarbon gases. It will be appreciated that since the excessively rich air fuel mixture is not completely burned within the cylinders, the unburned fuel discharged from the exhaust system of the motor vehicle is wasted. Not only is it uneconomical to discharge unburned fuel from the exhaust system of the motor vehicle because of incomplete combustion within the combustion chambers of the cylinders, but oftentimes the excess unburned fuel ignites or explodes within the muffler and tail pipe assembly of the exhaust system to possibly damage the same.

The present invention contemplates the provision of control means for preventing the introduction of fuel into the combustion chambers of the engine whenever the engine is running at a speed above a normal idling speed with the throttle plate of the carburetor in its closed position to thereby lower the fuel consumption of the engine, reduce backfiring in the muffler and exhaust system, and the emission of objectionable smoke and fumes from the exhaust system.

A further object of the invention is to devise and construct a pressure responsive valve for controlling the flow of fuel through the idle jet of a carburetor and more specifically to an idle jet control valve which is responsive to the pressure existing in the carburetor on both sides of the throttle plate.

A still further object is the provision of a pressure responsive valve for positively preventing the flow of fuel through the idle jet of the carburetor whenever the engine is operating at a speed above normal idling speed with the throttle plate in its closed position, but which is operative to automatically permit flow of fuel through the idle jet whenever the speed of the engine decelerates to the normal idling speed of the engine and/or when the throttle plate is moved from its closed position toward its open position.

Another object is the provision of a fuel controlling device which may be easily and quickly incorporated in the carburetor of gasoline type engines without requiring modification of the carburetor structurally and which will not influence the operation of the carburetor except during certain operating conditions of the engine.

The invention also contemplates the provision of an auxiliary actuating device for controlling the operation of a fuel control valve, whereby when the ignition circuit of the engine is de-energized the valve will be moved to its closed position to positively disestablish flow of fuel to the engine through the idle jet of the carburetor.

In modern day spark-ignition type engines, such as those used to propel motor trucks which oftentimes operate for long periods of time, hot spots are developed within the combustion chamber of the engine. Because of these hot spots the fuel mixture drawn into the combustion chamber, which is available for idling after the throttle plate of the carburetor is in its closed or idling position, is ignited when compressed within the engine cylinder even though the ignition circuit has been deenergized. Consequently, the engine continues running even though the ignition has been turned off. Normally in spark-ignition type engines the engines are stopped by deenergizing the ignition circuit. However, the carburetor is constructed to supply fuel to the engine cylinders even though the throttle plates are in their closed position to permit the engine to run at a predetermined idling speed under a no-load condition. The continued running of a carbureted spark-ignition type engine after the means for supply the spark ignition is ineffective by compression ignition is known as "dieseling." Thus, the present invention prevents engine "dieseling," as sometimes occurs when a gasoline engine is run for a relatively long time and hot spots are present within the combustion chambers whereby the engine continues to fire even though the ignition circuit is de-energized by igniting fuel drawn into the engine through the idle jet of the carburetor.

The foregoing and other important objects and desirable features inherent in and encompassed by the invention, together with many of the purposes and uses thereof, will become readily apparent from a reading of the ensuing description in conjunction with the annexed drawings in which:

Figure 1 is a vertical sectional view of an internal combustion engine carburetor embodying the invention;

Figure 2 is a sectional view taken substantially along line 2—2 of Figure 1;

Figure 3 is a sectional view taken substantially along line 3—3 of Figure 1 showing the valve means in its normally opened position;

Figure 4 is a sectional view similar to Figure 3 illustrating the valve means in its closed position;

Figure 5 is a fragmentary sectional view taken substantially along line 5—5 of Figure 2; and Figure 6 is a fragmentary sectional view similar to Figure 3 showing an "anti-dieseling" device incorporated into the fuel control means.

Referring to the drawings in detail wherein like reference characters designate like elements throughout the various views, there is shown a portion of the engine inlet manifold 10. A flange 11 surrounding the air-fuel mixture outlet portion 12 of a conventional two-barrel carburetor 13 is secured to the manifold 10. While a two-barrel carburetor 13 is shown and the invention will be described in detail in conjunction with such a carburetor, it is to be understood that the invention is equally applicable to a single barrel carburetor or a 4-barrel carburetor without departing from the spirit and scope of the invention. It is also to be understood that while the invention is shown incorporated in a down draft carburetor it is equally adaptable for use with an up draft type carburetor. As in conventional charge-forming carburetors, the carburetor 13 shown includes a bowl section 14 having a pair of suction passages 20 (only one of which is shown in Figure 1) extending therethrough arranged side by side. The upper and the lower ends of bowl section 14 are provided with encircling flanges 15 and 16, respectively. The upper flange 15 is adapted to be fastened to an air cleaner, not shown, while the lower flange 16 is provided with apertures 17 which are registerable with threaded apertures 18 formed in a flange 19 defining the upper end of the throttle plate body section 12, as viewed in Figure 1. In conventional carburetors the bowl section 14 is fastened to the throttle plate body section 12 by means of bolts which extend through the apertures 17 and are threaded into the apertures 18.

Each suction passage 20 of the bowl section 14 is coaxial with an air-fuel discharge passage 21 which extends through the throttle plate body section 12. Extending transversely through and journalled in the throttle plate body section 12 is a throttle shaft 22. An arm is secured to a projecting end of the throttle shaft 22 which arm, in turn, is operatively connected to throttle plate actuating means, not shown, extending to the operator's compartment of the vehicle whereby the throttle shaft 22 may be rocked and manually controlled from the operator's compartment in a conventional manner. It is to be understood that many suitable means may be provided for manually operating the throttle shaft 22 or for connecting it to the conventional accelerator pedal without departing from the spirit or the scope of invention. A pair of butterfly-type throttle plates 24 (one of which is shown in Figure 1) are secured to the throttle shaft 22. Each throttle plate 24 is disposed within a respective air-fuel discharge passage 21 and is adapted to move in unison with the other throttle plate upon rocking of the throttle shaft 22. Spring means, not shown, are provided for resiliency urging throttle plates 24 to their closed positions. The throttle plates 24 do not close to positions perpendicular to the axis of the air-fuel discharge passages 21 but are at a slight angle thereto as shown in Figure 1. An idling air and fuel supply jet or orifice 25 communicates with each air-fuel discharge passage 21 below the edge of a respective throttle plate 24 when they are in their closed positions. This construction is conventional in the carburetor art and as the throttle plates 24 approach closed positions the manifold vacuum below the throttle plates is applied directly to the idling fuel supply jets 25 which supply the necessary rich mixture for proper idling of the engine. The main jets, not shown, for supplying fuel come into operation after the throttle plates 24 have been opened a sufficient distance to produce a substantial air flow through the venturi of the suction passage 20 of the bowl section 14. Fuel is delivered to the idle jets 25 from a conventional carburetor float bowl, not shown, through vertically extending passageways 26 formed in the bowl section 14. When the bowl section 14 is assembled on the throttle plate body section 12 the passageways 26 are in communication, respectively, with passageways 27 which extend vertically from the flange 19 to the idling jets 25.

The control device, designated generally by numeral 28, is used in conjunction with the conventional carburetor structure described above for preventing the introduction of fuel into the combustion chambers of the engine whenever the engine is running at a speed above a normal idling speed with the throttle plates 24 of the carburetor 13 in their closed positions. The control device 28 includes a relatively flat plate 29 having spaced flat surfaces 30 and 31. Extending from one corner of the plate 29, as viewed in plan, and lying substantially in the plane of the plate is an enlarged cylindrical projection 32. The projection 32 is integrally-formed with the plate 29 and is provided with a central bore 33. The outer end of the projection 32 is provided with internal threads, as indicated by reference character 34, for a purpose which will be explained hereinafter. A bore 35 in axial alignment with and extending from the inner end of the bore 33 is formed in the plate 29. The bore 35 is of smaller diameter than the bore 33 and the shoulder 36 thus formed defining the inner end of the bore 33 and the outer end of the bore 35 is counterbored to provide a conical surface 37. The inner end of the bore 35 is defined by a radially extending annular shoulder 38. A bore 39 of much smaller diameter than the bore 35 is in axial alignment with the bores 33 and 35 and extends from the inner end of the bore 35 to a point spaced inwardly of the marginal edge 40 of the plate 29 opposite the projection 32. An integrally threaded recess 41 extends from the marginal edge 40 to the bore 39.

Extending through the plate 29 between surfaces 30 and 31 is a pair of air-fuel passageways 42. The air-fuel passageways 42 are circular in plan as shown in Figure 2 and each has a diameter corresponding to the upper end of a respective air-fuel discharge passage 21 and the lower end of a respective suction passage 20 formed in the bowl section 14. In order to incorporate the control device 28 within the carburetor 13, the bolts securing the bowl section 14 to the throttle plate body section 12 are removed and the sections are separated. The plate 29 is interposed between the lower flange 16 of the bowl section 14 and the upper flange 19 of the throttle plate body section 12. Gaskets 43 are provided in the assembly to obtain a fluid-tight connection. Bolts 44 extend through the apertures 17 formed in the lower flange 16 of the bowl section 14 as well as registering apertures 45 provided in the plate 29. The bolts 44 in turn are threaded into the apertures 18 to secure the bowl section 14, plate 29 and the throttle plate body section 12 together. When in this assembled relationship the suction passages 20 are coaxially aligned respectively with passages 21 and 42, in lieu of constructing the control device 28 as an accessory for installation between the two sections of the carburetor 13, it is to be understood that the control device 28 could be incorporated in a carburetor as an integral or unitary part thereof without departing from the spirit and scope of the invention.

A cap 46 is provided with a threaded reduced diameter section 47 intermediate its ends. The threads formed on the section 47 correspond to the internal threads 34 of the bore 33 and the cap 46 is adapted to be tightly screwed on the end of the projection 32. When securely fastened on the projection 32 the inner end 48 of the cap lies in a plane containing the shoulder 36. The section 49 extending from the reduced diameter threads section 47 to the terminal or marginal end face 48 of the cap 46 is cylindrical and has an outer diameter less than the internal diameter of the bore 33 to provide an annular chamber 50. The marginal end 48 is conical, as shown in Figure 3, to provide a surface 51 which is substantially parallel to the annular surface 37. Thus the chamber 50 is in communication with the bore 35. A central bore 52 extends from the marginal end 48 of the section 49 to a point short of the outer end face 53 of the cap 46. The bore 52 is coaxial with the bore 35 when the cap 46 is secured to the plate 29. A threaded recess 54 extends from the outer end face 53 of the cap 46 to the bore 52. A circular spring abutment plate 55 is disposed within the bore 52 and has affixed thereto a threaded element 56 which engages the threads of the recess 54 and extends therethrough. A lock nut 57 disposed exteriorly of the cap 46 also engages the threads of the element 56. Upon loosening the lock nut 57, the abutment plate 55 may be rotated causing its position with respect to the surface 58 defining the closed end of the bore 52 to be varied. The lock nut is then tightened on the threaded element 56 to maintain the adjusted position of the abutment plate 55. The reason for providing means for varying the position of the abutment plate 55 with respect to the closed end surface 58 of the bore 52 will become readily apparent hereinafter. Disposed within the bore 52 and having one end abutting the abutment plate 55 is a helically-wound compression spring 59. The opposite end section of the spring 59 encircles a cylindrical projection 60 which is integrally-formed with a piston 61. The piston 61 is provided with a plurality of axially spaced sealing grooves 62 and is adapted to engage the cylindrical surface 63 defining the bore 35 and slide between a first position wherein it engages the terminal end 48 of the section 49 and a second position wherein it engages the annular shoulder 38. Fixed to and extending from the end of the piston 61 opposite the cylindrical projection 60 is a rod 64 which is slidable within the bore 39. The rod 64 is provided with a pair of axially spaced annular grooves 65. The grooves 65 are axially spaced with respect to each other a distance substantially equal to the distance between the idle passageway 26 formed in the bowl section 14. Extending between surfaces 30 and 31 of the plate 29 are a pair of passageways 66 which have longitudinal axes intersecting the axis of the bore 39 substantially at right angles. When the plate 29 is sandwiched between the bowl section 14 and the throttle plate body section 12, the passageways 66 are in communication with the passageways 26 and 27 provided in the bowl section 14 and the throttle plate body section 12, respectively. When the piston 61 is in the position shown in Figure 3 wherein it engages the stop shoulder 38, fuel is permitted to flow from the passageways 26 to the passageways 27 by way of the passageways 66 and grooves 65. However, when the piston 61 is in the position wherein it abuts the end 48 of the section 49 of the cap 46, the rod 64 prevents the flow of fuel through the passageways 66. As stated hereinbefore, the invention contemplates the provision of control means for preventing the introduction of fuel into the combustion chambers of the engine whenever the engine is running at a speed above a normal idling speed with the throttle plate of the carburetor in its closed position. Thus since fuel does not flow from the main jets when the throttle plates 24 are closed the invention contemplates the control of fuel flowing through the idle jets or orifices 25. It is well established that there is a definite relationship between the engine speed and the vacuum existing in the engine intake manifold or air fuel passageways 21. In other words, in a typical carbureted piston type reciprocating engine the normal idling speed is approximately 400 revolutions per minute and the vacuum existing in the intake manifold is slightly more than 16″ of mercury. However, with the throttle plates closed and the vehicle coasting down a grade whereby the engine is being driven at a speed greater than 400 revolutions per minute, the vacuum may increase to a value in the neighborhood of 25″ of mercury in the intake manifold. Thus, in the present invention the valve rod 64 is moved to a position wherein the grooves 65 are out of alignment with the axis of the passageway 66 for positively preventing the flow of fuel therethrough whenever the vacuum existing in the air-fuel passageway 42 is equal to or slightly greater than the vacuum that would exist in the air-fuel passageways 42 if the engine was operating at a speed corresponding to normal idling speed. To accomplish this objective, a recess 67 is drilled through the projection 32 and is tapped for the reception of a pipe fitting 68 adapted to support a conduit 69. The opposite end of the conduit 69 is suitably connected to the throttle plate body section 12 or the intake manifold 10 and is thus in communication with the air-fuel passageways 21 or the interior of the intake manifold, respectively. The conduit 69 forms the means for communicating the pressure existing within the air fuel-passageway 21 to the interior of the projection 32. An opening 70 is also formed through the section 49 whereby the pressure existing within the bore 52 is the same as that existing within the air-fuel pasageways 21 during all phases of operation of the engine. Furthermore, the pressure existing within the air-fuel passageways 21 is also applied to the piston 61 through the annular space defined by the conical surface 37 and the surface 51. A duct 71 has one end opening into the bore 35 adjacent the shoulder 38 thereof and has its opposite end opening into one of the suction passages 20. A similar duct 72 opens into the other suction passage 20 and the bore 39 between the free end 73 of the rod 64 and the marginal edge 40 of the plate 29. A plug 74 is threaded into the recess 41 to seal the end of the bore 39. From the foregoing, it will be appreciated that the position of the grooves 65 with respect to the passageway 66 is influenced by the pressure existing above the throttle plates 24 which is applied to the inner piston face 75 and the free end 73 of the rod 64, the pressure existing in the intake manifold or the air-fuel passageways 21 which is applied to the outer piston face 76 opposite the inner piston face 75, and the compression spring 59. The amount of compressive force the spring 59 exerts upon the outer piston face 76 may be adjusted by varying the axial position of the abutment plate 55 with respect to the closed end of the bore 52. That is, as the abutment plate 55 is moved closer to the piston 61 the spring 59 is compressed causing the spring to exert a greater force upon the piston 61 to urge the same upon the shoulder 38, which position corresponds to the fully open position of the idle jets 25.

In operation, assuming the engine to be stopped and the throttle plates 24 in their closed positions, atmospheric pressure exists within the chamber 50 and thus on the outer piston face 76 as well as on the inner piston face 75 and the end 73 of the rod 64. The spring 59 being under compression at all times urges the inner piston face 75 upon the annular shoulder 38 and thus the grooves 65 are in alignment with the passageways 66 to permit fuel to flow therethrough. Assuming that the engine is then started and the vehicle is at a standstill, the throttle plates 24 are still in their closed positions. However, because of the suction effect of the engine pistons within their respective cylinders and because the throttle plates 24 are in their closed positions, the pressure existing within the intake manifold and air-fuel passageways 21 is sub-atmospheric. The chamber 77 at the end of the bore 39, defined by the plug 74 and the free end face 73 of the rod 64, is continually subjected to the same pressure as that which exists in the suction passages 20. The resulting force due to the pressure existing within the chamber 77 tends to move the piston 61 and rod 64 to the right, as viewed in Figure 4. A second force acting in the same direction but of greater magnitude than the force created by the pressure within chamber 77 results because of the pressure continually acting on the inner piston face 75. The sum of these two forces acts in opposition to the force exerted by the spring 59. Inasmuch as the outer piston face 76 is in communication with the chamber 50 which, in turn, is continually subjected to the same pressure as that which exists in the air-fuel passageways 21 still another force acts on the piston 61 and the rod 64. The direction of the force due to pressure within the chamber 50 obviously depends upon whether the pressure is above or below atmospheric pressure. It will also be appreciated that the magnitude of the force, whether it be a positive force tending to move the piston 61 and rod 64 to the left, as viewed in Figure 3, in conformity with the spring force or a negative force acting in opposition to the spring force, depends upon the position of the throttle plates 24 and the speed of the engine. Thus in the example being described, wherein the engine is operating at normal idling speed and the throttle plates 24 are closed, the vacuum in the chamber 50 results in a negative force which acts in unison with the forces created by the introduction of atmospheric pressure to the inner piston face 75 and the chamber 77 in opposition to the spring pressure. The spring pressure may be varied by adjusting the position of the abutment plate 55 as pointed out hereinbefore. However, the spring pressure for any particular engine is adjusted such that when the engine is idling normally with the throttle plates 24 in their closed position it prevails over the resultant force acting upon the piston 61 and rod 64 tending to move the inner piston face 75 off the annular seating shoulder 38 which corresponds to the open positions of the idle fuel passage valves. However, when the engine is running at wide open throttle under normal conditions at a comparatively high R. P. M. a sudden closing of the throttle plates 24 results in a high restriction in the airfuel passageways 21. A low depression or, stated in another way, a high vacuum is created in the intake manifold and air-fuel passageways which is considerably greater than that which exists there when the engine is idling normally. The same high vacuum condition exists as when a vehicle is traveling down hill with the throttle plates 24 closed and the ground-engaging wheels are rotating the engine crankshaft at a speed higher than the normal idling speed. When this high vacuum condition occurs in the chamber 50, the resultant force which includes the negative force acting on the outer piston face 76 in conjunction with the positive forces acting upon the inner piston face 75 and the free end 73 of the rod 64 is sufficient to overcome the spring pressure and, consequently, the piston 61 and the rod 64 move to the right as viewed in Figure 4, and the outer piston face 76 engages the marginal end 48 of the section 49. When the rod 64 is moved axially to this position the grooves 65 are moved out of axial alignment with the passageway 66 and thus fluid cannot flow through the passageway 66 to the idling jets or orifices 25. As the engine gradually decreases in speed and approaches the normal idling speed, the vacuum in the air fuel passageways 21 and thus the vacuum in the chamber 50 is reduced. When the normal idling vacuum exists in the chamber 50 which corresponds to approximately the normal idling speed of the engine with the throttle plates 24 closed, the force of the spring 59 moves the rod 64 to the left, as viewed in Figure 3, to open the passageways 66 to allow fuel to be supplied to the idling jets 25. It will also be appreciated that even though the speed of the engine is above idling speed the rod 64 may be moved to its normal position wherein fuel may flow through passageways 66 by manually opening the throttle plates 24. When this occurs the vacuum existing in the air fuel passageways 21 is reduced and approaches the pressure existing in the suction passages 20. The spring force then is sufficient to prevail over the forces tending to maintain the idle passageway valves in their closed positions and to cause seating of the inner piston face 75 upon the stop shoulder 38.

It will be appreciated from the foregoing that the control device 28 does not interfere with the normal operation of the engine and it is effective to control the supply of fuel only when the engine is being operated at speeds above normal idling speed and the throttle plates 24 are closed. When the engine speed drops to normal idling speed or upon any movement of the throttle plates 24 to their open positions fuel is quickly and automatically permitted to flow to the idling jets 25.

Inasmuch as the control device 28 described above has no orifices or conduits open to the atmosphere but is subjected to clean carburetor venturi air at all times, the device is not subjected to dirt and clogging by atmospheric contamination.

As stated hereinbefore, the invention contemplates provision of actuating means for controlling the flow of fuel through the passageways 66, which means depends upon the electrical condition of the engine ignition circuit which is independent of the speed of the engine and the position of the throttle plates 24. The auxiliary actuating means is constructed to be readily incorporated in the control device 28 and it is designed to move the rod 64 to the position shown in Figure 6 whenever the ignition circuit is deenergized. The anti-dieseling device, designated generally by reference character 78, includes a supporting plate 79 having one edge thereof provided with a screw-threaded projection 80. When incorporating the anti-dieseling device 78 into the control device 29, the plug 74 sealing the end of the bore 39 is removed and the projection 80 is screwed into the recess 41. In this manner the supporting plate 79 is mounted on the plate 29. The projection 80 is provided with a central longitudinally extending bore 81 through which an armature 82 is adapted to slide axially. A solenoid 83 is mounted upon the supporting plate 79 by any suitable means. Inside the solenoid 83 is a bearing tube (not shown) for slidably supporting the armautre 82. The solenoid 83, as in conventional solenoids, includes an electromagnet for operating the armature 82. An O-ring seal 84 mounted within the bore 81 prevents air and fuel leakage between the armature 82 and the projection 80. A spring (not shown) is disposed within the solenoid casing and urges the armature 82 to its extended position, as shown in Figure 6 whenever the solenoid is deenergized. As the armature 82 moves to its extended position, the end thereof engages the free end 73 of the rod 64 to slide the same axially to the position wherein the idle passageways 26 are communicatively isolated from the idling jets or orifices 25 to prevent the flow of fuel to the engine cylinders. Energization of the solenoid 83 causes retraction of the armature 82 out of engagement with the free end 73 of the rod 64. When the armature 82 is in this position, the rod 64 is permitted to move axially within the bore 39 to control the flow of fuel through the idle jets 25 in the manner as pointed out hereinbefore.

The ignition circuit for the engine is shown somewhat diagrammatically and includes an ignition switch 85 which has one contact thereof connected with one terminal of a storage battery 86. The other terminal of the battery is grounded as in conventional motor vehicle ignition circuits. A conductor 87 leads from one contact of the ignition switch 85 for energizing the various components of the ignition circuit. A conductor 88 is electrically connected with the conductor 87 and with one end of the solenoid 83. The other end of the solenoid is grounded. Thus when the ignition circuit for the engine is energized by closing of the ignition switch 85, the solenoid 83 will be energized causing the armature 82 to be withdrawn or retracted from engagement with the free end 73 of the rod 64 which movement compresses the solenoid spring. When it is desired to stop the engine the ignition switch 85 is opened which causes the deenergization of the electromagnet, whereupon the solenoid spring forces the armature 82 axially into engagement with the rod 64 to urge the same to the position shown in Figure 6. In this position of the rod 64 the grooves 65 are out of alignment with the pasagseways 66 so that not even an idling quantity of fuel can reach the engine cylinders and it will immediately stop running irrespective of hot spots in the combustion chambers that would cause ignition of the fuel and continued operation of the engine under idling conditions if the fuel supply to the engine was not completely and positively disrupted.

The embodiments of the invention chosen for the purposes of illustration and description herein are those preferred for achieving the objects of the invention and developing the utility thereof in the most desirable manner, due regard being had to existing factors of economy, simplicity of design and construction, production methods, and the improvements sought to be effected. It will be appreciated, therefore, that the particular structural and functional aspects emphasized herein are not intended to exclude but rather to suggest such other modifications and adaptations of the invention as fall within the spirit and scope of the invention as defined in the appended claims.

What is claimed is:

1. In a fuel supply device for an internal combustion engine, a carburetor having an air suction passage and an air-fuel mixture outlet passage in alignment therewith, and throttle plate means between said passages, an idling fuel conduit terminating adjacent the edge of said throttle plate means when in its closed position and opening into said air-fuel mixture outlet passage; a slidably mounted valve rod interposed in said conduit, said valve rod being alternatively slidable to one position to preclude the flow of fuel through said conduit and to an open position to permit the flow of fuel through said conduit; and actuating means operatively connected to said control valve rod for sliding the same including pressure responsive means, said means including a cylinder and a piston rigidly connected to one end of said valve rod, said piston being reciprocally mounted in said cylinder, the free end of said valve rod being disposed within a chamber, first conduit means leading from said suction passage to one side of said piston for subjecting said piston to the pressure existing in said suction passage, second conduit means leading from said air-fuel mixture outlet passage to said cylinder on the opposite side of said piston for subjecting said piston to the pressure existing in said air-fuel mixture outlet passage, third conduit means extending between said air suction passage and said chamber for subjecting the free end of said valve rod to the pressure existing in said suction passage, and yieldable means including a spring element engaging said piston for biasing said control valve rod to its normal opened position, said piston reciprocating to a position corresponding to the closed position of said control valve rod and overcoming the biasing effect of said spring element when the ratio of the pressure in said suction passage to the pressure in said air-fuel mixture outlet passage reaches a predetermined value greater than unity.

2. In a fuel supply device for an internal combustion engine substantially as set forth in claim 1, including a plunger projectable into said chamber and into operative engagement with the free end of said valve rod for sliding said valve rod to its closed position, yieldable means urging said plunger projectively into operative engagement with said valve rod, and means selectively operable for overcoming the force of said yieldable means for maintaining said valve plunger retracted and out of operative engagement with said valve rod.

3. In a fuel supply device for an internal combustion engine substantially as set forth in claim 2, wherein said means selectively operable for overcoming the force of said yieldable means for maintaining said plunger retracted and out of operative engagement with said valve rod includes an electromagnet having an armature rigidly connected with said plunger and a solenoid electrically energizable for moving said armature in a direction for retracting said valve plunger out of operative engagement with said valve rod.

4. In a fuel supply device for an internal combustion engine, a carburetor having an air suction passage and an air-fuel mixture outlet passage in alignment therewith, and throttle plate means between said passages, an idling fluid conduit terminating adjacent the edge of said throttle plate means when in its closed position and opening into said air-fuel mixture outlet passage; a fuel control valve interposed within said fuel conduit, said control valve being alternatively conditionable to preclude the flow of fuel through said conduit and to permit the flow of fuel through said conduit; and actuating means operatively connected to said control valve for conditioning the same including pressure responsive means, said pressure responsive means including a piston reciprocably mounted in a cylinder, first conduit means leading from said suction passage to said cylinder for subjecting said cylinder on one side of said piston to the pressure existing in said suction passage, and second conduit means leading from said air-fuel mixture outlet passage to said cylinder for subjecting said cylinder on the opposite side of said piston to the pressure existing in said air-fuel mixture outlet passage, and yieldable means including a spring element engaging said piston for biasing said control valve to its normally opened condition, said piston reciprocating to a postion within said cylinder corresponding to the closed condition of said control valve and overcoming the biasing effect of said spring element when the ratio of the pressure in said suction passage to the pressure in said air-fuel mixture outlet passage reaches a predetermined value greater than unity.

5. In a fuel supply device for an internal combustion engine substantially as set forth in claim 4, in which, adjustable means are provided for varying the biasing effect of said spring element.

6. In a fuel supply device for an internal combustion engine substantially as set forth in claim 4, in which, additional means are provided for moving said control valve to its closed position including a plunger advanceable in one direction into operative engagement with said control valve to move the control valve to its closed position, said plunger being retractable from operative engagement with said control valve, yieldable means operable when unrestrained for advancing said plunger into operative engagement with said control valve to move the same to its closed position, and means adapted to be operated for retracting said plunger from operative engagement with said control valve.

7. In a fuel supply device for an internal combustion engine, a carburetor having a fuel and air passage therethrough and throttle plate means within said passage intermediate the ends thereof, and a fuel supply conduit opening into said passage on one side of said throttle plate means when in its closed position; a control valve interposed within said conduit for controlling the flow of fuel to said passage from said conduit said control valve being movable between an opened position and a closed position to permit and preclude, respectively, the flow of fuel to said passage; actuating means operatively connected to said control valve for moving said control valve between its opened and closed positions including yieldable means biasing said control valve to its opened position, and pressure responsive means including a movable element, said pressure responsive means including a first conduit means leading from said passage on one side of said throttle plate means to one side of said movable element, and a second conduit means leading from said passage on the opposite side of said throttle plate means to the opposite side of said movable element whereby said movable elemnt is subjected to the pressure existing in said passage on both sides of said throttle plate means, said pressure responsive means overcoming said yieldable means to move said valve to its closed position from its opened position when the difference in pressure on opposite sides of said throttle plate means in said passage reaches a predetermined value greater than unity.

8. In a fuel supply device for an internal combustion engine, a carburetor having a fuel and air passage therethrough and throttle plate means within said passage intermediate the ends thereof, and a fuel supply conduit opening into said passage on one side of said throttle plate means when in its closed position; a control valve interposed within said conduit for controlling the flow of fuel to said passage, said control valve being movable between a normally opened position and a closed position to permit and preclude, respectively, the flow of fuel to said passage from said conduit; and actuating means operatively connected to said control valve for moving said valve between its opened and closed positions including pressure responsive means, said pressure responsive means including a movable element, a first conduit means leading from said passage on one side of said throttle plate means to one side of said movable element, and a second conduit means leading from said passage on the opposite side of said throttle plate means to the opposite side of said movable element whereby said movable element is subjected to the pressure existing in said passage on both sides of said throttle plate means, said actuating means being effective to move said valve to its closed position from its opened position when the difference in pressure on opposite sides of said throttle plate means existing in said passage reaches a predetermined value greater than unity.

9. In a fuel supply device for an internal combustion engine substantially as set forth in claim 8, including a plunger advanceable in one direction into abutting engagement with said control valve to move the same to its closed position, said plunger being retractable out of abutting engagement with said control valve, means yieldably biasing said plunger into abutting engagement with said control valve to move the same to its closed position, and electromagnet including an armature operably connected with said plunger and a solenoid electrically energizable to retract said armature and plunger against the force of said means yieldably biasing said plunger, and an electric circuit means including said solenoid and an engine ignition switch, said electric circuit means being operable attendant to the opening of said ignition switch to deenergize said solenoid.

10. In a fuel supply device substantially as set forth in claim 8, in which, adjusting means are provided for varying the pressure differential value at which the said actuating means becomes effective to move said valve to its closed position from its open position.

11. In a fuel supply device for an internal combustion engine, a carburetor having an air suction passage and an air-fuel mixture outlet passage in alignment therewith, and throttle plate means between said passages, an idling fuel conduit terminating adjacent the edge of said throttle plate means when in its closed position and opening into said air-fuel mixture outlet passage; a fuel control valve interposed within said fuel conduit, said control valve being alternatively conditionable to preclude the flow of fuel through said fuel conduit and to permit the flow of fuel through said conduit; and actuating means operatively connected to said control valve for conditioning the same including pressure responsive means, said pressure responsive means including a movable element, a first conduit means leading from said suction passage to one side of said movable element, and a second conduit means leading from said outlet passage to the opposite side of said movable element whereby one side of said movable element is subjected to the pressure existing in said suction passage and the opposite side thereof is subjected to the pressure existing in said air-fuel mixture outlet passage, said actuating means being effective to establish one condition of said control valve when the ratio of the pressure in said suction passage to the pressure in said air-fuel mixture outlet passage reaches a predetermined value greater than unity and to establish the other condition of said control valve when said pressure ratio is below said predetermined value.

12. In a fuel supply device for an internal combustion engine substantially as set forth in claim 11, in which, adjustable means are provided for varying the pressure ratio value greater than unity at which said actuating means becomes effective to establish said one condition of said control valve.

13. In a fuel supply device for an internal combustion engine, a carburetor including a bowl section having an air suction passage and an idle fuel duct spaced from said suction passage extending therethrough and a throttle plate body section having an air-fuel mixture outlet passage and an idle fuel duct extending therethrough, said air suction passage and said air-fuel mixture outlet passage being in alignment when said sections are secured together, said idle fuel ducts also being in alignment when said sections are secured together, and a throttle plate means mounted in said throttle plate body section in said air-fuel mixture outlet passage, said idle fuel duct in said throttle plate body section having one end thereof opening into said air-fuel mixture outlet passage adjacent the edge of said throttle plate means when in its closed position; a flat plate adapted to be positioned between said bowl section and said throttle body section, said plate having upper and lower flat surfaces for attachment to said sections, and having a bore formed therethrough between said flat surfaces, a fuel passageway extending between said flat surfaces and disposed parallel to said bore and being separated therefrom, a slidably mounted valve rod in said plate for opening and closing said fuel passageway, said flat surfaces being parallel and said bore and fuel passageway extending normally thereto in parallelism and being adapted to be aligned with said air suction passage and said air-fuel mixture outlet passage and said idling fuel ducts respectively when said plate is secured to said bowl and throttle body plate sections; and actuating means operatively connected to said control valve for sliding said valve rod including pressure responsive means, said means including a cylinder and a piston rigidly connected to one end of said valve rod, said piston being reciprocally mounted in said cylinder, the free end of said valve rod being disposed within a chamber formed in said plate, a duct extending through said plate leading from said suction passage to one side of said piston for subjecting said piston to the pressure existing in said suction passage, conduit means leading from said air-fuel mixture outlet passage to said cylinder on the opposite side of said piston for subjecting said piston to the pressure existing in said air-fuel mixture outlet passage, and a second duct formed in said plate extending between said air suction passage and said chamber for subjecting the free end of said valve rod to the pressure existing in said suction passage, and yieldable means including a spring element engaging said piston for biasing said control rod to its normal opened position, said piston reciprocating with respect to said plate to a position corresponding to the closed position of said control valve rod and overcoming the biasing effect of said spring element when the ratio of the pressure in said suction passage to the pressure in said air-fuel mixture outlet passage reaches a predetermined value greater than unity.

14. In a fuel supply device for an internal combustion engine substantially as set forth in claim 13, including a plunger mounted on said plate advanceable in one direction to operatively engage the free end of said valve rod for sliding the same to its closed position, biasing means for urging said plunger to a retracted position out of operative engagement with the free end of said valve rod and an electric solenoid including an armature operatively connected to said plunger and an electromagnet, said electromagnet when energized being operable to retract said plunger, electric circuit means for energizing said electromagnet including an ignition switch, said plunger being effective to move said control valve rod to its closed position upon deenergization of said electric circuit means by opening of said ignition switch.

References Cited in the file of this patent

UNITED STATES PATENTS

| | | |
|---|---|---|
| 1,956,992 | Mallory | May 1, 1934 |
| 2,212,936 | Hoof | Aug. 27, 1940 |

FOREIGN PATENTS

| | | |
|---|---|---|
| 967,518 | France | Mar. 29, 1952 |